United States Patent
Kim et al.

(10) Patent No.: US 12,375,784 B2
(45) Date of Patent: Jul. 29, 2025

(54) CAMERA MODULE WITH PIEZOELECTRIC DRIVING MEMBER

(71) Applicant: SAMSUNG ELECTRO-MECHANICS CO., LTD., Suwon-si (KR)

(72) Inventors: Do Hwan Kim, Suwon-si (KR); Ju Ho Kim, Suwon-si (KR); Sang Hyun Ji, Suwon-si (KR); Jung Hyun Park, Suwon-si (KR); Nam Keun Oh, Suwon-si (KR); Doo Seub Shin, Suwon-si (KR); Dong Hoon Lee, Suwon-si (KR); Jong Eun Park, Suwon-si (KR); Sangik Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 101 days.

(21) Appl. No.: 18/318,273

(22) Filed: May 16, 2023

(65) Prior Publication Data

US 2024/0155212 A1  May 9, 2024

(30) Foreign Application Priority Data

Nov. 8, 2022 (KR) .................. 10-2022-0148010

(51) Int. Cl.
*H04N 23/51* (2023.01)
*G03B 17/02* (2021.01)
*H04N 23/54* (2023.01)

(52) U.S. Cl.
CPC ............. *H04N 23/51* (2023.01); *G03B 17/02* (2013.01); *H04N 23/54* (2023.01)

(58) Field of Classification Search
CPC ........ H04N 23/51; H04N 23/54; H04N 23/00; H04N 23/55; H04N 23/57; H04N 23/687;
(Continued)

(56) References Cited

U.S. PATENT DOCUMENTS

2005/0224707 A1* 10/2005 Guedj ................... H10F 30/221
                                                              257/E27.141
2007/0290576 A1    12/2007 Johansson et al.
(Continued)

FOREIGN PATENT DOCUMENTS

JP    2018-518712 A    7/2018
KR    10-2009-0023682 A    3/2009
(Continued)

OTHER PUBLICATIONS

Korean Office Action issued on Jul. 3, 2024, in counterpart Korean Patent Application No. 10-2022-0148010 (8 pages in English, 7 pages in Korean).

Primary Examiner — Usman A Khan
(74) Attorney, Agent, or Firm — NSIP Law

(57) ABSTRACT

A camera module includes: a first body including a substrate; an image sensor mounted on the substrate; a second body including a lens module; a ball bearing disposed between the first body and the second body to enable movement of the second body relative to the first body; and a driving member disposed between the first body and the second body to provide driving force to move the second body in at least one direction intersecting an optical axis.

12 Claims, 10 Drawing Sheets

(58) Field of Classification Search
CPC .. G03B 17/02; G03B 5/04; G03B 2205/0015;
G03B 2205/0061; G03B 2205/0069
USPC .................................................. 348/207.99
See application file for complete search history.

(56) References Cited

U.S. PATENT DOCUMENTS

| | | | |
|---|---|---|---|
| 2008/0258579 A1* | 10/2008 | Yamada ................. G02B 7/08 | |
| | | | 310/328 |
| 2010/0039718 A1* | 2/2010 | Nishimiya ........... H02N 2/0095 | |
| | | | 359/824 |
| 2011/0109968 A1 | 5/2011 | Park et al. | |
| 2011/0292273 A1 | 12/2011 | Kim et al. | |
| 2015/0201127 A1 | 7/2015 | Ahn | |
| 2017/0139225 A1* | 5/2017 | Lim ..................... H04N 23/687 | |
| 2019/0098184 A1 | 3/2019 | An | |
| 2019/0346740 A1* | 11/2019 | Suh ......................... G03B 5/00 | |
| 2020/0266729 A1 | 8/2020 | Danell et al. | |
| 2021/0173175 A1 | 6/2021 | Itagaki et al. | |
| 2021/0173225 A1* | 6/2021 | Lee ....................... G02B 27/646 | |
| 2021/0239933 A1* | 8/2021 | Tseng ..................... H04N 23/54 | |
| 2021/0278797 A1* | 9/2021 | Katz ................... G03G 21/1671 | |
| 2022/0334346 A1 | 10/2022 | Lee | |

FOREIGN PATENT DOCUMENTS

| | | |
|---|---|---|
| KR | 10-1022938 B1 | 3/2011 |
| KR | 10-1075688 B1 | 10/2011 |
| KR | 10-2011-0130337 A | 12/2011 |
| KR | 10-2014-0001640 A | 1/2014 |
| KR | 10-2018-0097012 A | 8/2018 |
| KR | 10-2019-0128898 A | 11/2019 |
| KR | 10-2020-0002357 A | 1/2020 |
| KR | 10-2020-0037318 A | 4/2020 |
| KR | 10-2021-0042915 A | 4/2021 |
| KR | 10-2021-0102124 A | 8/2021 |

* cited by examiner

CAMERA MODULE WITH PIEZOELECTRIC DRIVING MEMBER

CROSS-REFERENCE TO RELATED APPLICATION(S)

This application claims the benefit under 35 USC 119(a) of Korean Patent Application No. 10-2022-0148010 filed on Nov. 8, 2022 in the Korean Intellectual Property Office, the entire disclosure of which is incorporated herein by reference for all purposes.

BACKGROUND

Field

The following description relates to a camera module which may perform an optical image stabilization function.

Description of the Background

A small camera module may be mounted in a small electronic device. For example, the small camera module may be mounted in a mobile phone. The camera module may perform clear imaging. For example, the camera module may include an optical image stabilization (OIS) member to reduce a phenomenon in which a resolution is degraded due to a user's hand-shake.

The optical image stabilization member of the camera module may usually include a plurality of magnet members and a plurality of coil members. For example, two or more pairs of magnet members and coil members may be disposed on different sides of a lens module to move the lens module in an optical axis direction. However, the above-described optical image stabilization member may cause malfunctioning of nearby electronic components due to a magnetic field occurring between the magnet member and the coil member. In addition, the above-described optical image stabilization member may require the plurality of magnet members, the plurality of coil members, and a plurality of ball bearings, which may hinder a smaller weight of the camera module.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a first body including a substrate; an image sensor mounted on the substrate; a second body including a lens module; a ball bearing disposed between the first body and the second body and configured to enable movement of the second body relative to the first body; and a driving member disposed between the first body and the second body, and configured to provide driving force to move the second body in at least one direction intersecting an optical axis.

The driving member may include: a piezoelectric member disposed in the first body; and a pad disposed on the second body and in contact with the piezoelectric member.

One of the piezoelectric member and the pad may include a protrusion.

An end of the protrusion may have a hemispherical shape.

The camera module may include a detection sensor disposed in the first body and configured to detect a position of the second body.

At least one of the first body and the second body may include a seating portion configured to accommodate the ball bearing.

The camera module may include an elastic member disposed in the first body and configured to restore a position of the second body moved by the driving member.

In another general aspect, a camera module includes: a substrate; an image sensor mounted on the substrate; a housing accommodating the substrate; a ball bearing in contact with a first surface of the substrate; and a driving member disposed between a second surface of the substrate and the housing, and configured to provide driving force to move the substrate in at least one direction intersecting an optical axis.

The camera module may include a detection sensor disposed on the substrate or in the housing and configured to detect a position of the substrate.

One of the substrate and the housing may include a seating portion configured to accommodate the ball bearing.

The substrate may include: a central portion on which the image sensor is disposed; an edge portion surrounding the central portion; and a connection part connecting the central portion to the edge portion, and enabling movement of the central portion.

The driving member may include: a piezoelectric member disposed in the first body; and a pad disposed on the second body and in contact with the piezoelectric member.

One of the piezoelectric member and the pad may include a protrusion.

An end of the protrusion may have a hemispherical shape.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
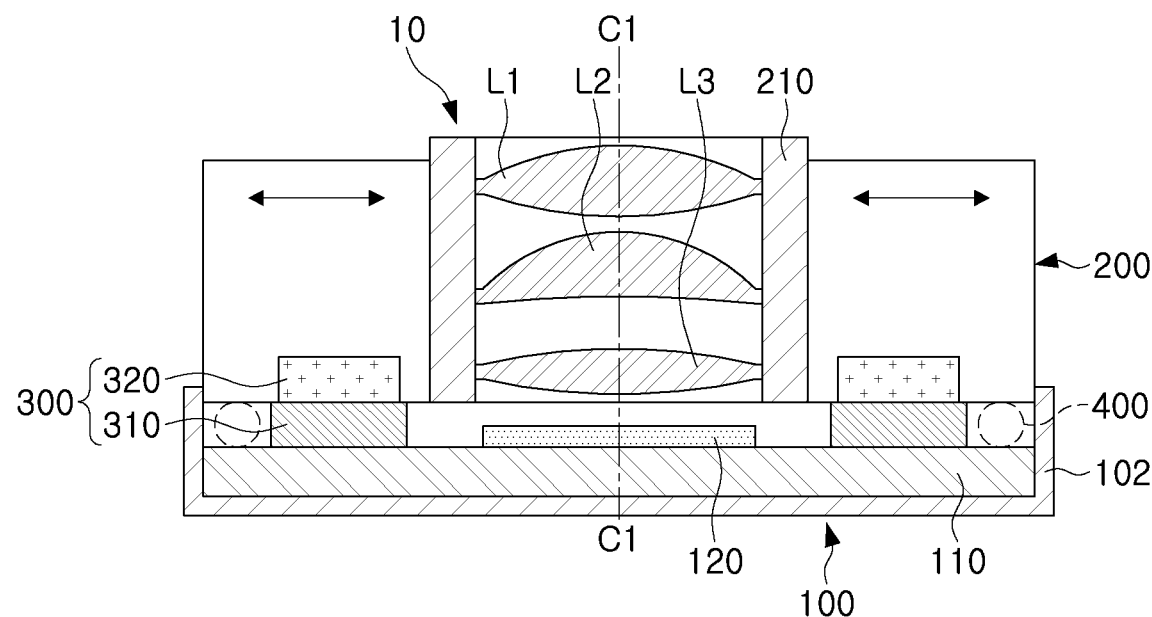
FIG. 1 is a configuration diagram of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

A camera module in the various examples may be mounted on an electronic device. For example, the camera module may be mounted on a portable terminal, a laptop computer, a virtual reality (VR) device, glasses or the like. However, the electronic devices on which the camera module may be mounted are not limited to the above devices. For example, the camera module may be mounted on all portable electronic devices such as portable game machines.

The camera module according to the various examples may include an image sensor converting an optical signal into an electrical signal and a lens module forming an image of incident light on the image sensor. In addition, the camera module may include a driving member enabling movement of the lens module relative to the image sensor. The lens module may be disposed in a different space from the image sensor to facilitate its movement relative to the image sensor. For example, the image sensor may be disposed in a first body of the camera module, and the lens module may be disposed in a second body of the camera module. In addition, the camera module may include a ball bearing to enable movement of the second body, relative to the first body. The second lens module may be moved in a direction intersecting an optical axis. For example, the second lens module may be moved in a direction substantially perpendicular to the optical axis.

A camera module according to the various examples may drive an image sensor in a direction intersecting an optical axis. For example, the camera module may further include a driving member for driving the image sensor in the direction intersecting the optical axis. In the camera module according to this example, a substrate on which the image sensor is mounted may be disposed between a ball bearing and the driving member. In detail, the ball bearing may be disposed on a first surface of the substrate, and the driving member may be disposed on a second surface of the substrate. The substrate configured as above may be moved rapidly and smoothly by the ball bearing and the driving member in the direction intersecting the optical axis.

Hereinafter, various examples will now be described in detail with reference to the accompanying drawings. First, the camera module according to an example is described with reference to FIGS. 1 through 6.

A camera module 10 may include a first body 100, a second body 200, a first driving member 300, and a ball bearing 400. However, the camera module 10 is not limited to including only the above-described components.

Figure 2:
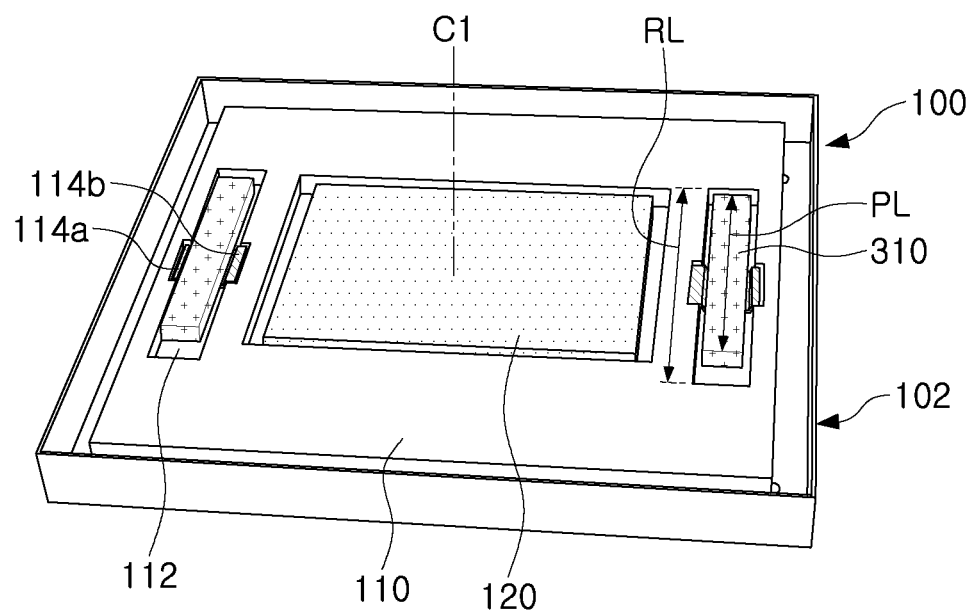
FIG. 2 is a front perspective view of a first body shown in FIG. 1.

As shown in FIG. 2, the first body 100 may include a housing 102, a substrate 110, and an image sensor 120. However, the first body 100 is not limited to the configuration shown in FIG. 2.

The housing 102 may partially or fully accommodate the substrate 110. For example, the housing 102 may have a shape of a hexahedron with an open upper portion to accommodate the substrate 110. However, a shape of the housing 102 is not limited to the hexahedron.

The substrate 110 may have a shape enabling the substrate 110 to be mounted in the housing 102. For example, the substrate 110 may have a size and a thickness enabling the substrate 110 to be accommodated in an inner space of the housing 102. The substrate 110 may include one or more electronic components included in the camera module 10. For example, a passive element may be disposed on one surface of the substrate 110. For another example, the passive element may be embedded in the substrate 110. The substrate 110 may electrically connect the plurality of electronic components with each other. For example, a printed circuit for electrically connecting the electronic components mounted on the substrate 110 with each other may be positioned on the upper surface, lower surface, or inside of the substrate 110.

The substrate 110 may easily dispose the first driving member 300 thereon. For example, an accommodating groove 112 in which a portion of the first driving member 300 may be disposed may be positioned in one surface of the substrate 110. However, the accommodating groove 112 is not necessarily positioned in one surface of the substrate 110.

The image sensor 120 may be disposed on the substrate 110. For example, the image sensor 120 may be mounted on the upper surface of the substrate 110. The image sensor 120 may be electrically connected to the substrate 110. For example, the image sensor 120 may not only be connected to the substrate 110 by the printed circuit positioned on the substrate 110, but also be electrically connected to other electronic components disposed on the substrate 110. The image sensor 120 may convert the optical signal into the electrical signal. For example, the image sensor 120 may convert the optical signal incident through one or more lenses into the electrical signal.

The second body 200 may include a lens module 210, as shown in FIG. 1. However, the second body 200 is not limited to including only the lens module 210. For example, the second body 200 may further include a second driving member (not shown) driving the lens module 210 in an optical axis direction.

The lens module 210 may include one or more lenses L1, L2, and L3. For example, as shown in FIG. 1, the lens module 210 may include three lenses L1, L2, and L3. However, the number of lenses included in the lens module 120 is not limited to three. For example, the lens module 120 may include two or fewer lenses or four or more lenses.

The lens module 210 may be aligned with the image sensor 120. For example, the lens module 210 may be disposed for an optical axis C1 of the lens module 210 and an optical axis C1 of the image sensor 120 to substantially coincide with each other.

The first driving member 300 may drive the second body 200. For example, the first driving member 300 may move the second body 200 in a direction intersecting the optical axis C1. The first driving member 300 may be disposed between the first body 100 and the second body 200. In detail, one end of the first driving member 300 may be fixed to the first body 100, and the other end of the first driving member 300 may be in direct or indirect contact with the second body 200.

The first driving member 300 may include a piezoelectric member 310 and a pad 320. However, the first driving member 300 is not limited to including only the above-mentioned components. For example, the first driving member 300 may further include a connection member electrically connecting the piezoelectric member 310 and the substrate 110 with each other.

As shown in FIG. 2, the piezoelectric member 310 may be disposed in an upper portion of the substrate 110. For example, the piezoelectric member 310 may be disposed in the accommodating groove 112. The accommodating groove 112 may have a larger cross-sectional area than the piezoelectric member 310, so as not to interfere with mechanical deformation or mechanical movement of the piezoelectric member 310. As a specific example, a length RL of the accommodating groove 112 may be greater than a length PL of the piezoelectric member 310. A current terminal 114a and/or 114b for supplying a driving current to the piezoelectric member 310 may be positioned in the substrate 110 or in the accommodating groove 112. The current terminals 114a and 114b may respectively be in contact with different side surfaces of the piezoelectric member 310.

The pad 320 may be disposed on the second body 200. For example, the pad 320 may be positioned on a bottom surface of the second body 200 substantially facing the piezoelectric member 310 disposed in the first body 100. The pad 320 may be in contact with the piezoelectric member 310. For example, the pad 320 may be in contact with at least a portion of the piezoelectric member 310 in a state where the first body 100 and the second body 200 are coupled with each other. The pad 320 may transmit a driving force of the piezoelectric member 310 to the second body 200. For example, the pad 320 may be made of a material having considerable hardness and strength or a material having a large friction coefficient, thus transmitting the mechanical movement of the piezoelectric member 310 transmitted therethrough to the second body 200 as it is.

Figure 3:
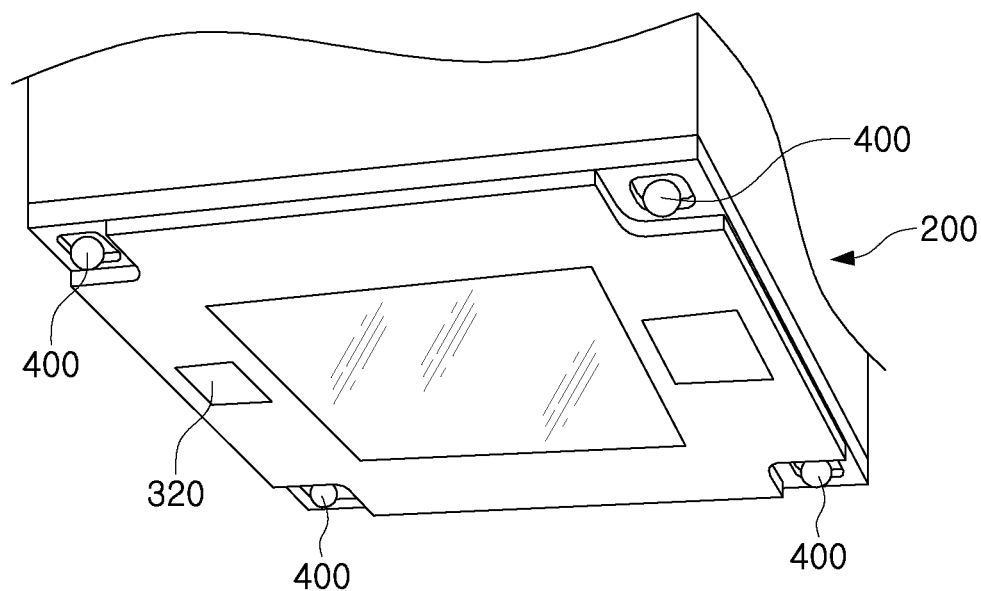
FIG. 3 is a bottom perspective view of a second body shown in FIG. 1.

The ball bearing 400 may enable smooth movement of the second body 200 relative to the first body 100. For example, one or more ball bearings 400 may be disposed between the first body 100 and the second body 200 to enable the smooth movement of the second body 200 by the first driving member 300. As shown in FIG. 3, the ball bearing 400 may be positioned at a corner of the second body 200. However, the ball bearing 400 is not limited to being positioned as shown in FIG. 3. For example, the ball bearing 400 may be disposed adjacent to the pad 320.

Figure 4:
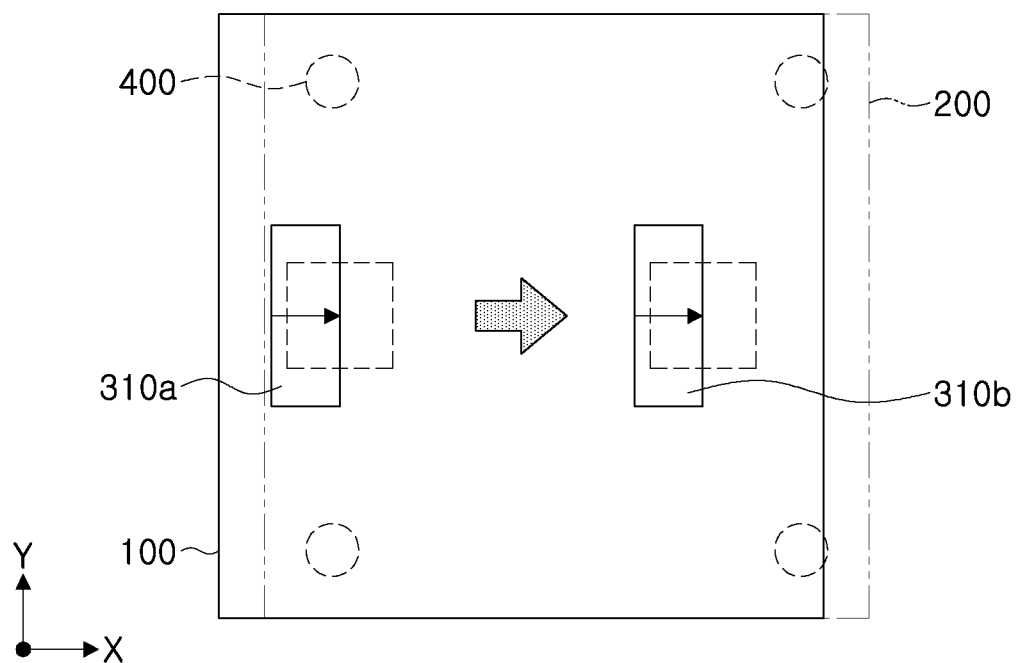
FIGS. 4, 5, and 6 are plan views of the first body showing a driving type of the second body by a driving member.
Figure 5:
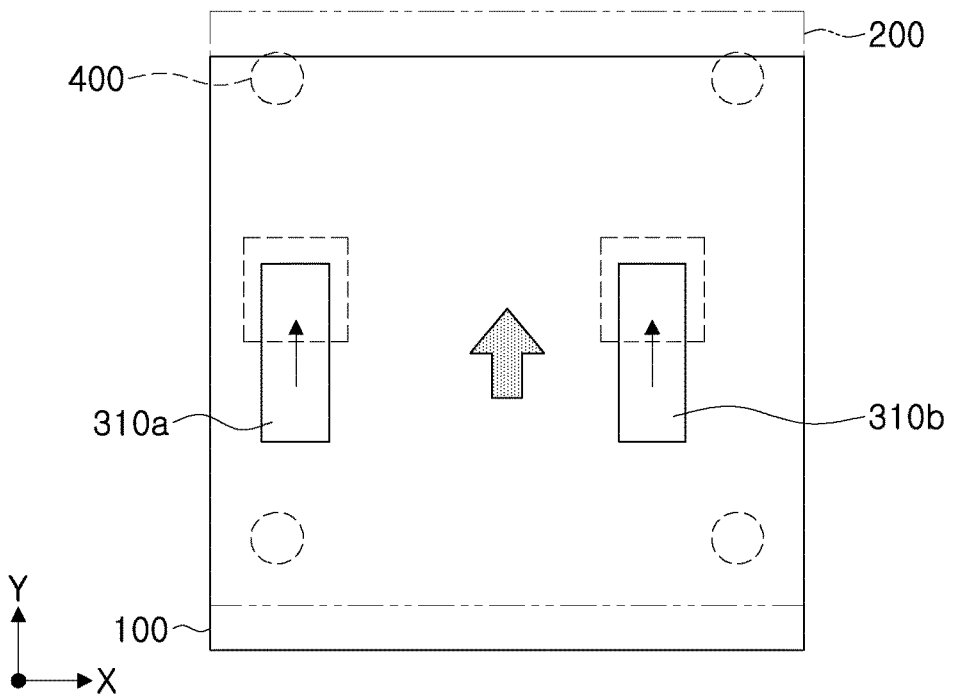
Figure 6:
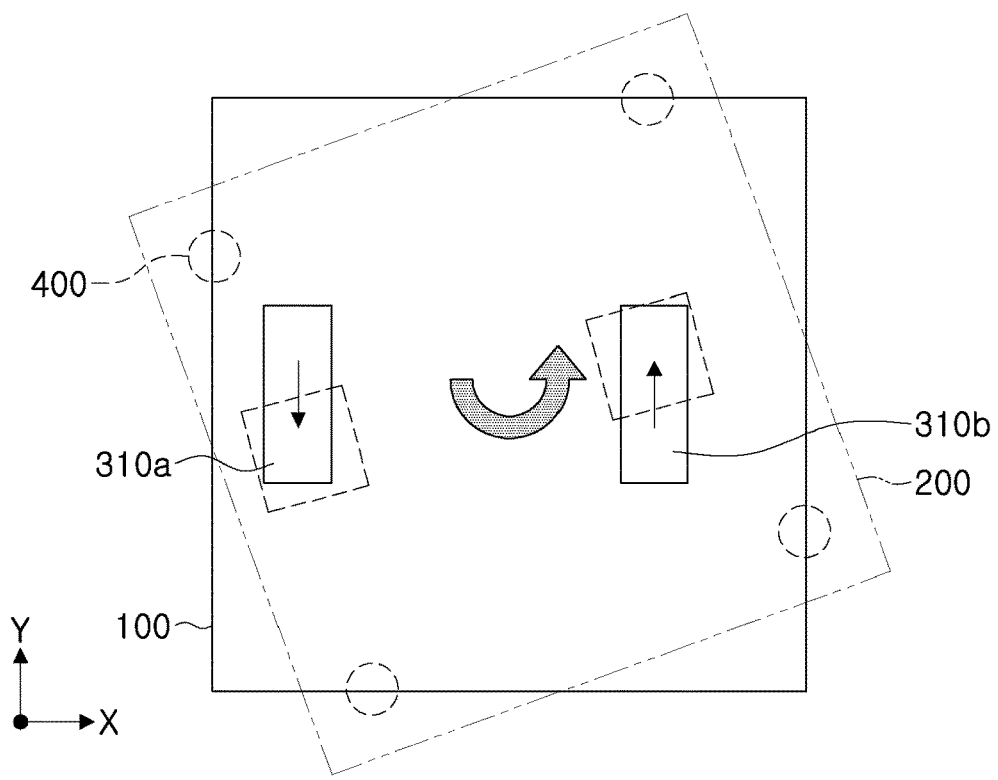

Next, an operation example of the camera module 10 according to this example is described with reference to FIGS. 4 through 6.

The camera module 10 may perform an optical image stabilization function. For example, piezoelectric members 310a and 310b may cause the mechanical deformation in a +X-axis direction to thus move the second body 200, thereby offsetting an impact when the corresponding impact is applied to the camera module 10 in a first direction (−X-axis direction) (see FIG. 4). For another example, the piezoelectric members 310a and 310b may cause the mechanical deformation in a +Y-axis direction to thus move the second body 200, thereby offsetting an impact when the corresponding impact is applied to the camera module 10 in a second direction (−Y-axis direction) (see FIG. 5). For still another example, the piezoelectric members 310a and 310b may cause the mechanical deformation in the different directions (i.e., −Y axis direction and +Y-axis direction) to thus move the second body 200, thereby offsetting an impact when the corresponding impact is applied to the camera module 10 simultaneously in the first direction and the second direction (−Y-axis direction and +Y-axis direction) (see FIG. 6).

The camera module 10 configured as above may rapidly perform the optical image stabilization through the piezoelectric member(s) 310 (310a and 310b), thereby improving an imaging quality of the camera module 10. In addition, the camera module 10 according to this example uses no driving magnet and no driving coil, thereby preventing harmful electromagnetic waves occurring between the driving magnet and the driving coil and a resultant magnetic field interference phenomenon. Therefore, the camera module 10 may significantly reduce or prevent malfunctions of nearby electronic devices and electronic components that are caused by the harmful electromagnetic waves.

The camera module 10 according to this exemplary embodiment may be modified differently from its shape shown in FIGS. 1 through 6.

Figure 7:
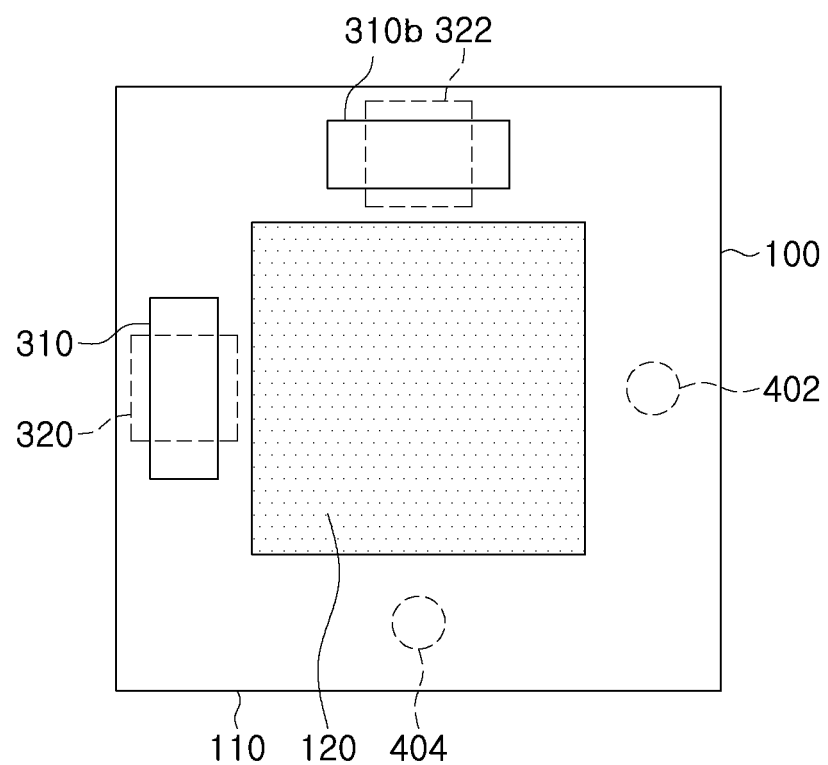
FIG. 7 is a plan view of the first body showing another disposed type of the driving member.

For example, the camera module 10 may have modified positions of the first driving member and ball bearing as shown in FIG. 7. For example, the piezoelectric members 310a and 310b may face the two adjacent side surfaces of the image sensor 120, and ball bearings 402 and 404 may face the other two side surfaces of the image sensor 120. Also, the pads 320 and 322 may be disposed to correspond to the modified positions of the piezoelectric members 310a and 310b.

Figure 8:
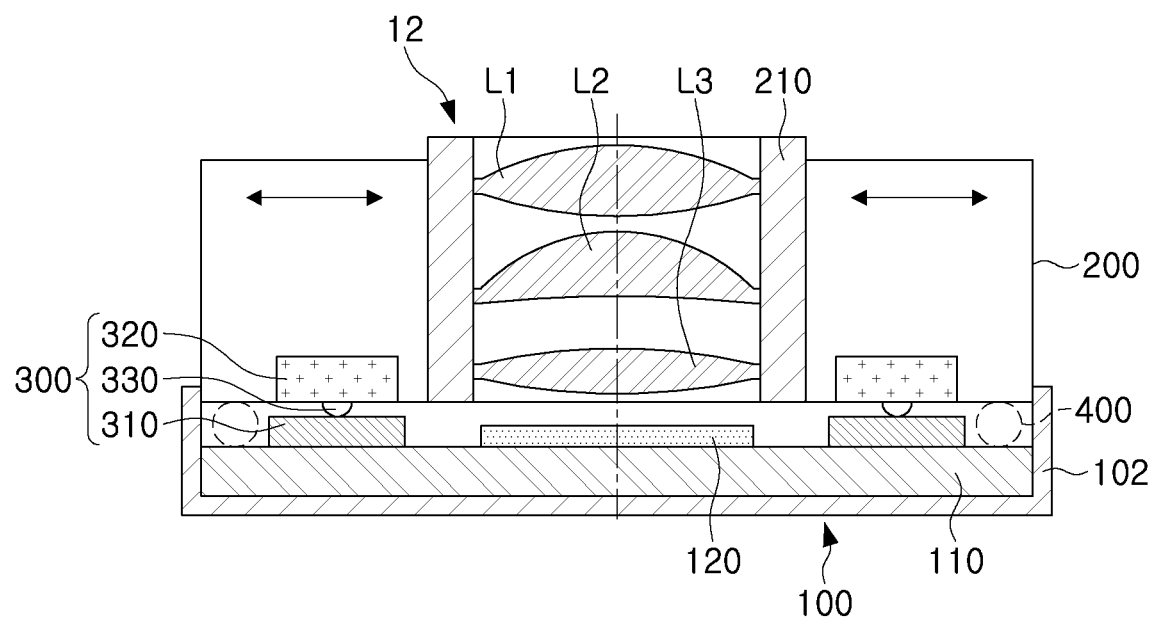
FIGS. 8 and 9 are configuration diagrams of camera modules according to modified examples.

For another example, a camera module 12 may have a modified shape of the piezoelectric member 310 or pad 320 so that mechanical energy generated from the piezoelectric member 310 may be effectively transmitted to the pad 320. As a specific example, a protrusion 330 may be position on the pad 320 as shown in FIG. 8. A portion of the protrusion 330 may substantially have a hemispherical shape. For example, an end of the protrusion 330 may have the hemispherical shape. The protrusion 330 may concentrate the mechanical energy generated from the piezoelectric member 310 on a contact point between the piezoelectric member 310 and the pad 320 (i.e., tip of the protrusion 330), thereby increasing driving efficiency of the second body 200 by the piezoelectric member 310. For reference, although FIG. 8 shows that the protrusion 330 is positioned on the pad 320, the protrusion 330 may be positioned on the piezoelectric member 310 instead of the pad 320.

Figure 9:
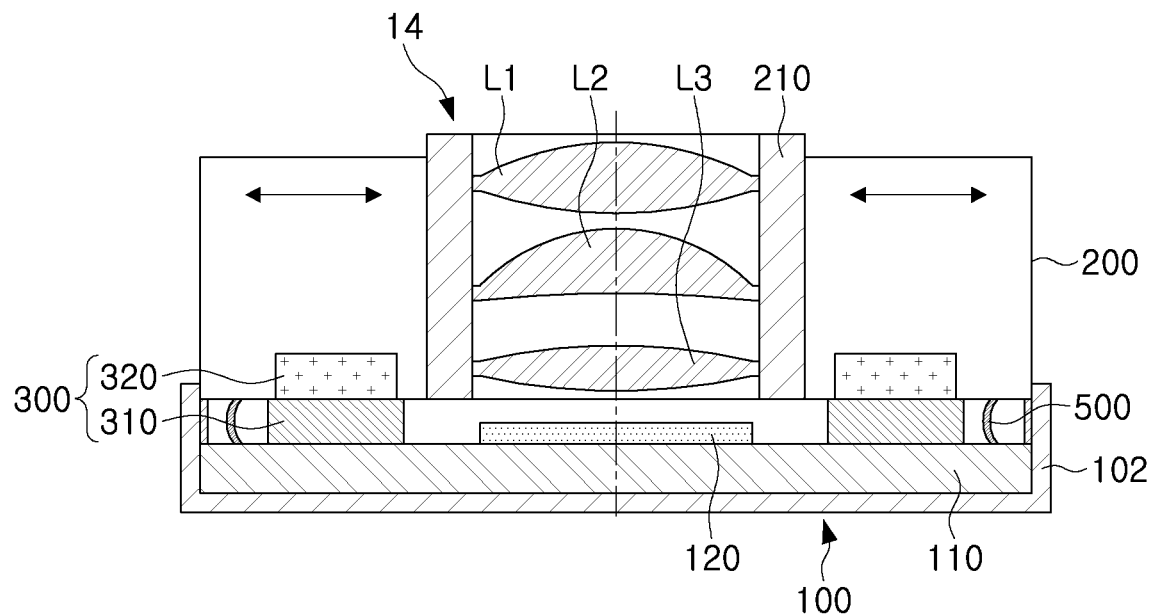

For another example, a camera module 14 may further include a component for restoring position of the second body 200. As a specific example, as shown in FIG. 9, the camera module 14 may further include an elastic member 500 connecting the first body 100 and the second body 200 with each other. One end and the other end of the elastic member 500 may respectively be connected to the first body 100 and the second body 200, thereby maintaining a constant distance between the first body 100 and the second body 200. The elastic member 500 may serve to restore the second body 200 moved by the first driving member 300 to its original position while allowing the movement of the second body 200 by the first driving member 300.

For reference, although not shown in the accompanying drawings, two or more of the shapes shown in FIGS. 7 through 9 may be selectively merged into the camera module 10 shown in FIG. 1.

In addition, although not shown in FIGS. 1 through 9, the first body may further include a detection sensor detecting the position of the second body. In addition, seating portions may respectively be positioned in the first body and the second body to stably support the ball bearings.

Next, a camera module according to another example is described with reference to FIGS. 10 through 16.

A camera module 20 may include a first body 100, a second body 200, a first driving member 300, and a ball bearing 400. In addition, the camera module 20 according to this exemplary embodiment may further include a second driving member 600. However, the camera module 20 according to this exemplary embodiment is not limited to including only the above-mentioned components.

The first body 100 may include a substrate 110, an image sensor 120, the first driving member 300, and the ball bearing 400. However, the first body 100 is not limited to including only the above-mentioned components. For example, the first body 100 may further include a detection member 700.

The substrate 110 may be disposed in the first body 100. The substrate 110 may be in non-contact with the first body 100. In detail, the substrate 110 may be supported by the first driving member 300 and the ball bearing 400 not to be in direct contact with an inner surface of the first body 100. The substrate 110 may be moved in the first body 100. For example, the substrate 110 may be moved by the first driving member 300 in a length direction of the substrate 110 (i.e., direction intersecting the optical axis C).

The image sensor 120 may be disposed on the substrate 110. For example, the image sensor 120 may be disposed an upper portion of the substrate 110. However, the image sensor 120 is not limited to being positioned on the upper portion of the substrate 110.

The first driving member 300 may move the substrate 110 and the image sensor 120. For example, the first driving member 300 may move the substrate 110 and the image sensor 120 in the direction intersecting the optical axis C. The first driving member 300 may include a piezoelectric member 310, a pad 320, and a protrusion 330. However, the first driving member 300 is not limited to including only the above-mentioned components.

Figure 10:
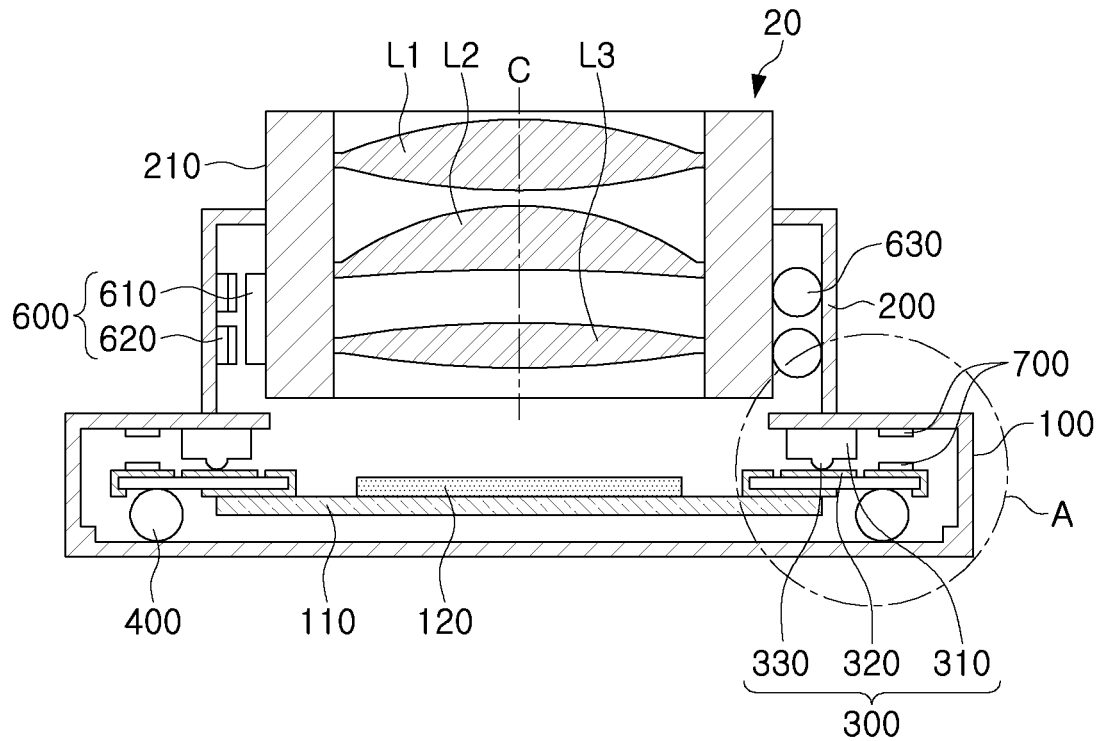
FIG. 10 is a configuration diagram of a camera module according to an example.
Figure 11:
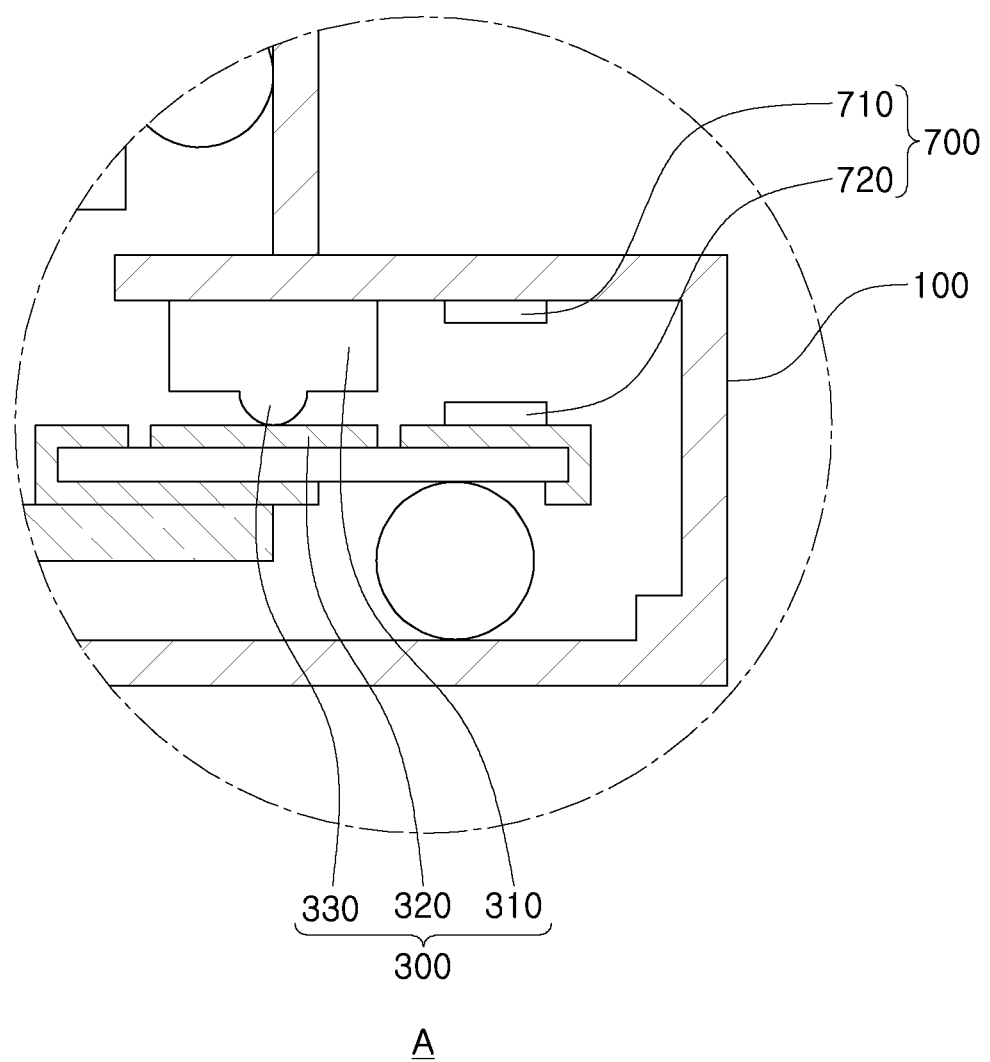
FIG. 11 is an enlarged view of part A of FIG. 10.

The piezoelectric member 310 may be disposed in the first body 100. In detail, the piezoelectric member 310 may be disposed in a portion of the first body 100 to face one surface of the substrate 110. The pad 320 may be positioned on the substrate 110. In detail, the pad 320 may be positioned on a portion of the substrate 110 to face the piezoelectric member 310. The protrusion 330 may be positioned on the piezoelectric member 310, and protrude to the substrate 110 to be in contact with the pad 320. For reference, although FIG. 10 shows that the protrusion 330 is positioned on the piezoelectric member 310, the protrusion 330 may be positioned on the pad 320.

The protrusion 330 may minimize a contact area between the piezoelectric member 310 and the pad 320 while enabling physical contact between the piezoelectric member 310 and the pad 320. For example, the protrusion 330 may be in point contact with the pad 320. For example, an end of the protrusion 330 may have a hemispherical shape. However, the end of the protrusion 330 is not limited to having the hemispherical shape. For example, the end of the protrusion 330 may have a conical or pyramid shape. The protrusion 330 configured as above may concentrate mechanical energy generated from the piezoelectric member 310 on the contact point with the pad 320, thereby enabling rapid movement of the substrate 110 and image sensor 120 by the piezoelectric member 310.

The ball bearing 400 may be disposed between the first body 100 and the substrate 110. For example, the ball bearing 400 may be disposed between an inner bottom surface of the first body 100 and a bottom surface of the substrate 110. However, the ball bearing 400 is not limited to being positioned as described above. For example, the ball bearing 400 may be disposed on an upper portion of the substrate 110 when the first driving member 300 is disposed on a lower portion of the substrate 110. The ball bearing 400 may enable smooth movement of the substrate 110. In detail, the ball bearing 400 may reduce a driving friction of the substrate 110 while maintaining a constant distance between the first body 100 and the substrate 110, and the substrate 110 may be moved rapidly and smoothly in the direction intersecting the optical axis C.

The detection member 700 may detect positions of the substrate 110 and the image sensor 120. For example, the detection member 700 may detect position of the substrate 110 moved in the direction intersecting the optical axis C. The detection member 700 may include a detection magnet 710 and a detection sensor 720. The detection magnet 710 may be disposed on the first body 100, and the detection sensor 720 may be disposed on the substrate 110. The detection magnet 710 and the detection sensor 720 may substantially face each other. For example, the detection sensor 720 may face at least a portion of the detection magnet 710 regardless of movement position of the substrate 110. The detection member 700 configured as above may detect the position of the substrate 110 by measuring the magnitude and direction of a magnetic force of the detection magnet 710 through the detection sensor 720.

The second body 200 may include a lens module 210 and a second driving member 600. However, the second body 200 is not limited to including only the above-mentioned components.

The lens module 210 may include one or more lenses L1, L2, and L3. For example, as shown in FIG. 10, the lens module 210 may include three lenses L1, L2, and L3. However, the number of lenses included in the lens module 210 is not limited to three. For example, the lens module 210 may include two or fewer lenses or four or more lenses.

The second driving member 600 may enable the camera module 20 to perform an auto focusing function or a zoom function. For example, the second driving member 600 may enable the auto focusing (AF) or zoom of the camera module 20 by moving the lens module 210 in a direction of the optical axis C. The second driving member 600 may include a driving magnet 610, a driving coil 620, and a bearing 630. The driving magnet 610 may be disposed on the lens module 210. For example, the driving magnet 610 may be disposed on an outer circumferential surface of the lens module 210. The driving coil 620 may be disposed on the second body 200. For example, the driving coil 620 may be disposed on an inner side surface of the second body 200 to face the driving magnet 610. The bearing 630 may be disposed between the lens module 210 and the second body 200. For example, the bearing 630 may be disposed between the outer circumferential surface of the lens module 210 and an inner circumferential surface of the second body 200. The second driving member 600 configured as above may perform the AF function and/or zoom function of the camera module 20 by moving the lens module 210 in the optical axis direction.

Next, a more detailed configuration of the first body 100 is described with reference to FIGS. 12 and 13.

Figure 12:
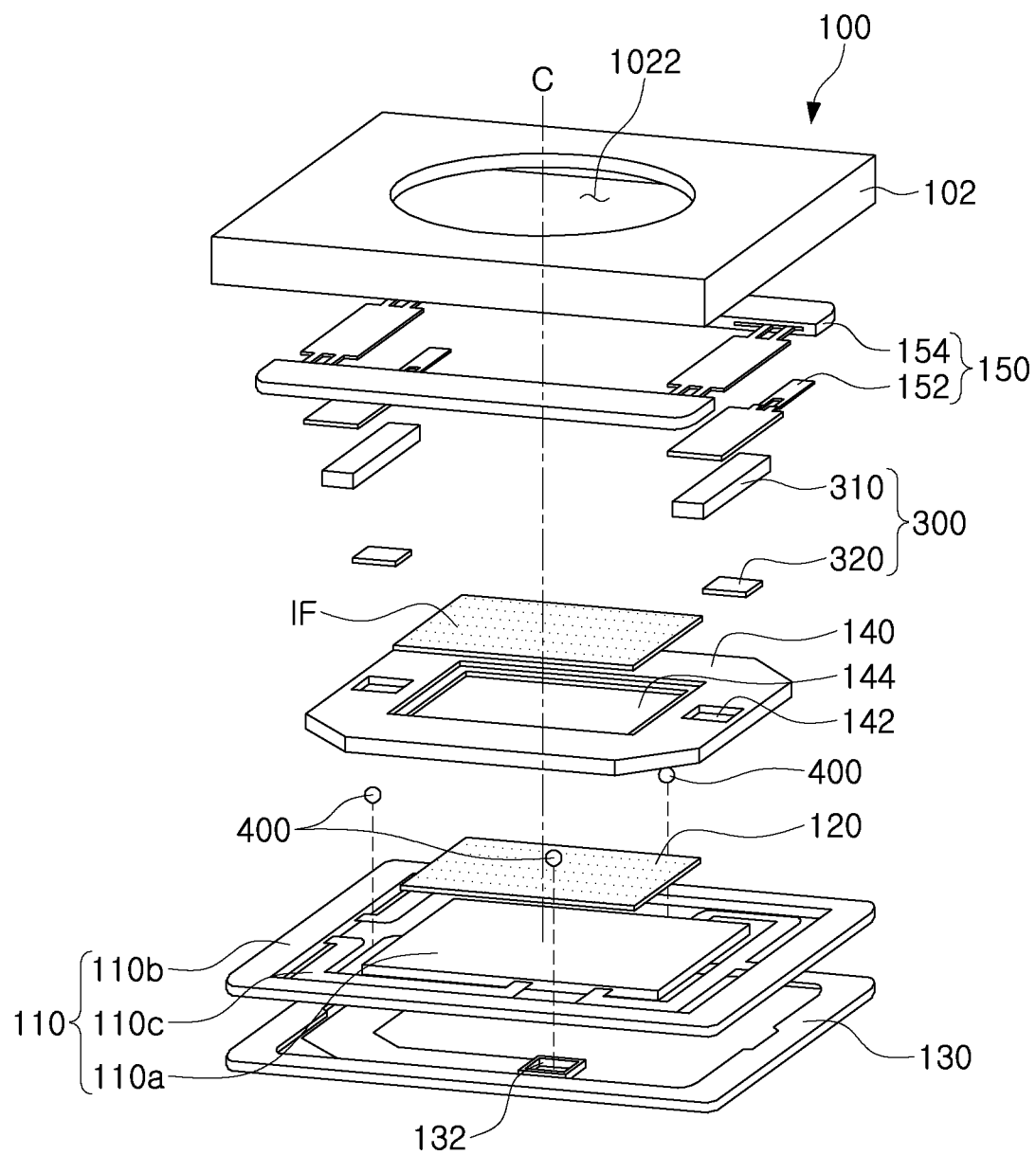
FIG. 12 is an exploded perspective view of a first body shown in FIG. 10.

As shown in FIG. 12, the first body 100 may include a housing 102, the substrate 110, the image sensor 120, a first support frame 130, a second support frame 140, a current supply unit 150, a filter IF, the driving member 300, and the ball bearing 400. However, the first body 100 is not limited to including only the above-mentioned components.

The housing 102 may accommodate most of the components included in the first body 100. For example, the housing 102 may have a shape of a hexahedron enabling the housing 102 to all accommodate the substrate 110, the image sensor 120, the first support frame 130, the second support frame 140, the current supply unit 150, the filter IF, the driving member 300, and the ball bearing 400. However, the housing 102 may not necessarily accommodate the above-mentioned components. For example, the housing 102 may accommodate only some of the above-mentioned components.

The housing 102 may transmit light incident from one direction. For example, a window 1022 may be positioned in an upper portion of the housing 102 to allow light externally incident to reach the image sensor 120.

The substrate 110 may include a central portion 110a, an edge portion 110b, and a connection part 110c. The central portion 110a may provide a space in which the image sensor 120 may be mounted. For example, the central portion 110a may be wider than the image sensor 120 to support the image sensor 120 and be electrically connected to the image sensor 120. The edge portion 110b may surround the central portion 110a and may fix the position of the substrate 110. For example, the edge portion 110b may be firmly coupled with the first support frame 130 respectively disposed on the lower portion and the upper portion of the substrate 110, thereby fixing the position of the substrate 110 relative to the first support frame 130. The connecting part 110c may connect the central portion 110a and the edge portion 110b with each other. For example, the connecting part 110c may connect an outer surface of the central portion 110a and an inner surface of the edge portion 110b with each other. The connection part 110c may enable movement of the central portion 110a. For example, the connection part 110c may enable the movement of the central portion 110a (in the direction intersecting the optical axis) even when the edge portion 110b is firmly coupled with the first support frame 130. For example, the connection part 110c may be made of a material elastically deformed easily. For another example, as shown in FIG. 12, the connection part 110c may be considerably long to facilitate its bending deformation. As a specific example, as shown in FIG. 12, the connection part 110c may connect one side surface of the central portion 110a and one side surface of the edge portion 110b that do not face each other with each other. The connection part 110c configured as above may enable the movement of the central portion 110a through the bending deformation.

The image sensor 120 may be disposed on the substrate 110. For example, the image sensor 120 may be disposed on the central portion 110a of the substrate 110. The image sensor 120 may convert an optical signal into an electrical signal. For example, the image sensor 120 may convert light incident through the lens module 210 into the electrical signal. The image sensor 120 may be a charged coupled device (CCD) or a metal oxide silicon (MOS) field effect transistor.

The first support frame 130 and the second support frame 140 may be coupled with the substrate 110. For example, the first support frame 130 may be coupled with the edge portion 110b of the substrate 110, and the second support frame 140 may be coupled with the central portion 110a of the substrate 110. Position of the first support frame 130 coupled with the edge portion 110b of the substrate 110 may be fixed, and the second support frame 140 coupled with the central portion 110a may be moved together with the central portion 110a.

The first support frame 130 may support the ball bearing 400. For example, a seating portion 132 which may accommodate a portion of the ball bearing 400 may be positioned in the first support frame 130. The second support frame 140 may accommodate some components of the first driving member 300. For example, a seating portion 142 which may accommodate some components of the first driving member 300 may be positioned in the second support frame 140. A window 144 allowing transmittance of light may be positioned in the second support frame 140. The window 144 may have substantially the same size as the image sensor 120 or be wider than the image sensor 120 so that light incident through the lens module 210 is incident to the image sensor 120 as it is. A member for improving performance of the camera module 20 may be selectively disposed in the window 144. For example, the filter IF for blocking an ultraviolet (UV) ray or a protective glass for preventing entrance of a foreign material may be disposed in the window 144.

The current supply unit 150 may supply a current necessary for driving the first driving member 300. The current supply unit 150 may include a terminal part 152 and a substrate part 154. However, the current supply unit 150 is not limited to including only the terminal part 152 and the substrate part 154. The terminal part 152 may be electrically connected with a driving part (i.e., piezoelectric member) of the first driving member 300, and the substrate part 154 may supply the current to the terminal part 152. An electronic component for controlling or adjusting an amount of the current supplied to the first driving member 300 may be mounted on the substrate part 154. The substrate part 154 may be electrically connected with the substrate 110. For example, the substrate part 154 may be electrically connected with the edge portion 110b of the substrate 110.

The first driving member 300 may drive the central portion 110a of the substrate 110. For example, the first driving member 300 may move the central portion 110a of the substrate 110 in the direction intersecting the optical axis C. The first driving member 300 may be disposed between the substrate 110 and the housing 102. As a specific example, the first driving member 300 may be disposed between the second support frame 140 and the current supply unit 150.

The first driving member 300 may include the piezoelectric member 310 and the pad 320. As shown in FIG. 12, the piezoelectric member 310 may be in contact with the terminal part 152 of the current supply unit 150. The pad 320 may be disposed on the second support frame 140. For example, the pad 320 may be disposed on the seating portion 142 positioned on the second support frame 140. The pad 320 may be in contact with the piezoelectric member 310. For example, the pad 320 may be in contact with at least a portion of the piezoelectric member 310. The pad 320 may transmit a driving force of the piezoelectric member 310 to the second support frame 140 and the central portion 110a of the substrate 110. For example, the pad 320 may be made of a material having considerable hardness and strength or a material having a large friction coefficient, thus transmitting mechanical movement of the piezoelectric member 310 transmitted therethrough to the second support frame 140 and the central portion 110a of the substrate 110 as it is.

The ball bearing 400 may be disposed between the first support frame 130 and the second support frame 140. The ball bearing 400 may enable smooth movement of the central portion 110a relative to the edge portion 110b of the substrate 110. For example, as shown in FIG. 12, the ball bearing 400 may be disposed in the seating portion 132 of the first support frame 130, thus enabling the smooth movement of the central portion 110a relative to the first support frame 130 and the edge portion 110b. Meanwhile, although FIG. 12 shows that three ball bearings 400 are arranged around the image sensor 120, the number of the ball bearings 400 disposed between the first support frame 130 and the second support frame 140 may be increased or reduced.

Figure 13:
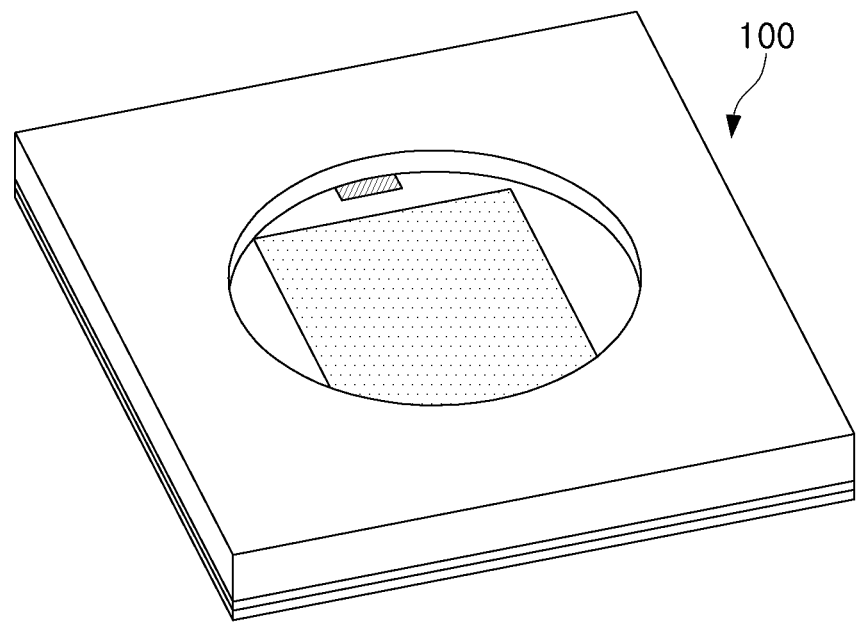
FIG. 13 is a plan view showing main configuration shown in FIG. 12.
Figure 14:
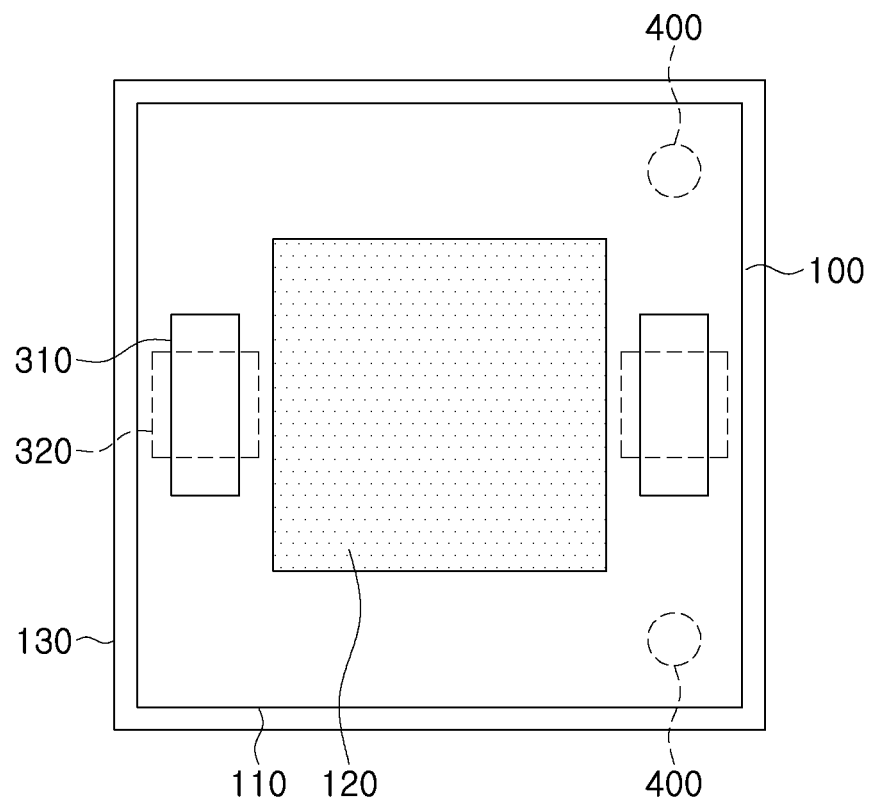
FIGS. 14, 15, 16, and 17 are plan views of a substrate showing a driving type of the substrate by a driving member.
Figure 15:
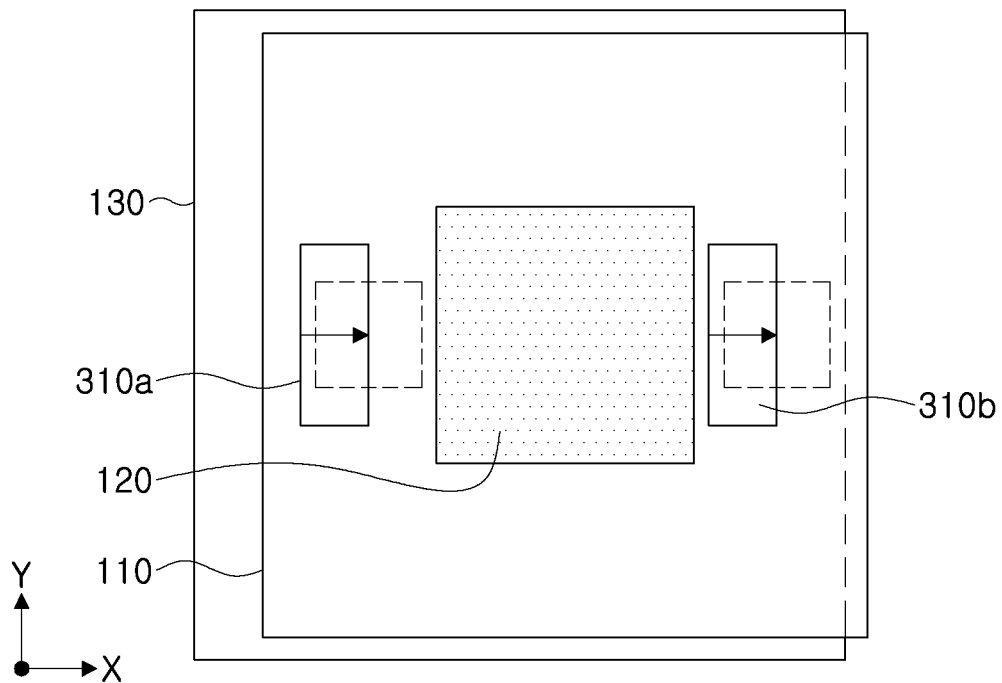
Figure 16:
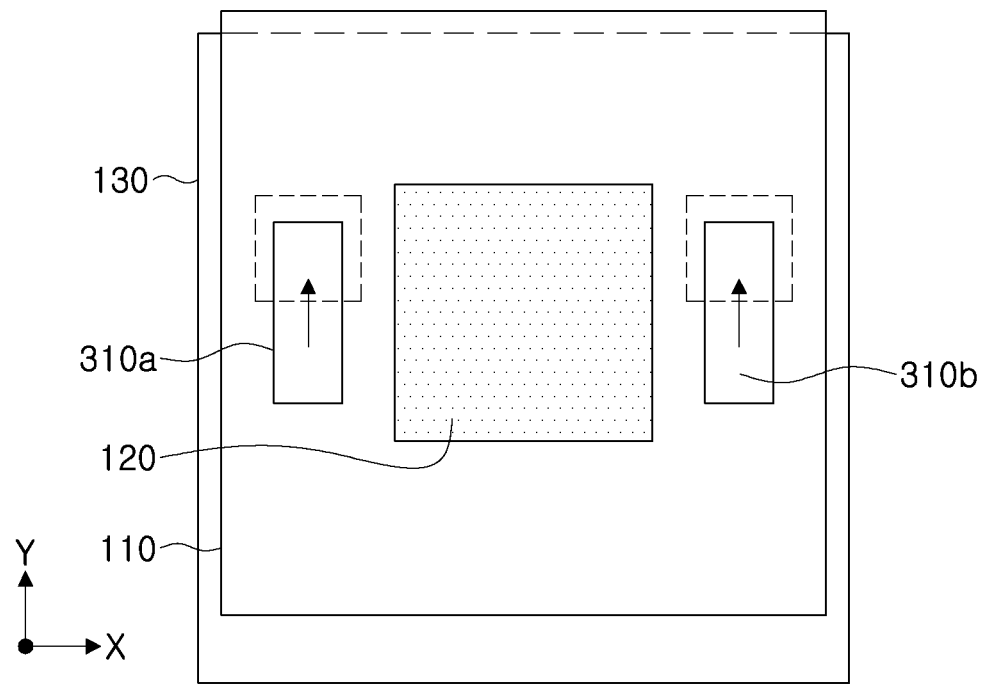
Figure 17:
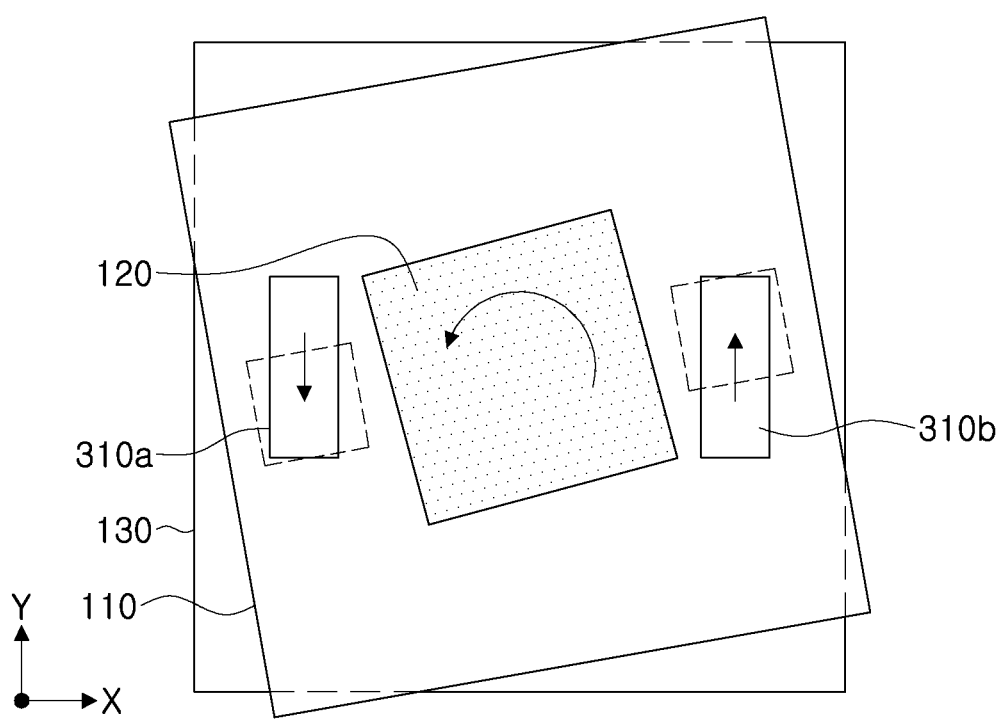

As shown in FIG. 13, the first body 100 may have a smaller thickness.

Next, an operation example of the camera module 20 according to this example is described with reference to FIGS. 14 through 17.

The camera module 20 may perform an optical image stabilization function. For example, the image sensor 120 may be moved to compensate for modified position of the image sensor 120 when the image sensor 120 has the modified position by an external impact in a state shown in FIG. 14. For example, piezoelectric members 310a and 310b may cause mechanical deformation in an +X-axis direction to thus move the substrate 110 and the image sensor 120, thereby offsetting an impact when the corresponding impact is applied to the camera module 20 in a first direction (−X-axis direction) (see FIG. 15). For another example, the piezoelectric members 310a and 310b may cause the mechanical deformation in a +Y-axis direction to thus move the substrate 110 and the image sensor 120, thereby offsetting an impact when the corresponding impact is applied to the camera module 20 in a second direction (−Y-axis direction) (see FIG. 16). For still another example, the piezoelectric members 310a and 310b may cause the mechanical deformation in the different directions (i.e., −Y axis direction and +Y-axis direction) to thus rotate the substrate 110 and the image sensor 120, thereby offsetting an impact when the corresponding impact is applied to the camera module 20 simultaneously in the first direction and the second direction (see FIG. 17).

The camera module 20 configured as above may rapidly perform the optical image stabilization through the piezoelectric member 310, thereby improving an imaging quality of the camera module 20. In addition, the camera module 20 may prevent harmful electromagnetic waves from substantially occurring from the first driving member 300 disposed adjacent to the image sensor 120, thereby reducing breakage or malfunctions of the image sensor 120 by the harmful electromagnetic waves.

As set forth above, the camera modules according to the various examples may use the piezoelectric element that does not generate the electromagnetic wave as the driving member, thereby removing the magnetic field interference caused by the driving member.

In addition, the camera modules according to the various examples may minimize the configuration of the driving member necessary for driving the lens module or the substrate, thereby enabling the smaller weight of the camera module.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a first body including a substrate;
   an image sensor mounted on the substrate;
   a second body including a lens module;
   a ball bearing disposed between the first body and the second body and configured to enable movement of the second body relative to the first body; and
   a driving member disposed between the first body and the second body, and configured to provide driving force to move the second body in at least one direction intersecting an optical axis,
   wherein the driving member comprises
   a piezoelectric member disposed in the first body; and
   a pad disposed on the second body facing the piezoelectric member in an optical axis direction and configured to be in contact with the piezoelectric member in order to transmit the driving force of the piezoelectric member to the second body.

2. The camera module of claim 1, wherein one of the piezoelectric member and the pad includes a protrusion.

3. The camera module of claim 2, wherein an end of the protrusion has a hemispherical shape.

4. The camera module of claim 1, further comprising a detection sensor disposed in the first body and configured to detect a position of the second body.

5. The camera module of claim 1, wherein at least one of the first body and the second body includes a seating portion configured to accommodate the ball bearing.

6. The camera module of claim 1, further comprising an elastic member disposed in the first body and configured to restore a position of the second body moved by the driving member.

7. A camera module comprising:
   a substrate;
   an image sensor mounted on the substrate;
   a housing accommodating the substrate;
   a ball bearing in contact with a first surface of the substrate; and
   a driving member disposed between a second surface of the substrate and the housing, and configured to provide driving force to move the substrate in at least one direction intersecting an optical axis,
   wherein the driving member comprises
   a piezoelectric member disposed on the substrate; and
   a pad disposed on the lens module facing the piezoelectric member in an optical axis direction and configured to be in contact with the piezoelectric member in order to transmit the driving force of the piezoelectric member to the substrate.

8. The camera module of claim 7, further comprising a detection sensor disposed on the substrate or in the housing and configured to detect a position of the substrate.

9. The camera module of claim 7, wherein one of the substrate and the housing includes a seating portion configured to accommodate the ball bearing.

10. The camera module of claim 7, wherein the substrate includes:
    a central portion on which the image sensor is disposed;
    an edge portion surrounding the central portion; and
    a connection part connecting the central portion to the edge portion, and enabling movement of the central portion.

11. The camera module of claim 7, wherein one of the piezoelectric member and the pad includes a protrusion.

12. The camera module of claim 11, wherein an end of the protrusion has a hemispherical shape.

* * * * *